United States Patent
Hammer

[11] Patent Number: 5,911,324
[45] Date of Patent: Jun. 15, 1999

[54] DEBRIS CATCHING POUCH

[76] Inventor: Alan J. Hammer, 4 Clarendon Close, Bearsted Maidstone Kent ME14 4JD, United Kingdom

[21] Appl. No.: 09/121,342

[22] Filed: Jul. 23, 1998

[51] Int. Cl.$^6$ .............. B65D 79/00; A47F 5/08
[52] U.S. Cl. .......... 206/527; 206/460; 206/813
[58] Field of Search .................. 206/527, 460, 206/461, 813; 383/84, 98

[56] References Cited

U.S. PATENT DOCUMENTS

| | | | |
|---|---|---|---|
| 2,689,594 | 9/1954 | Wendt | 206/813 |
| 3,561,670 | 2/1971 | Segal | 206/813 |
| 3,747,776 | 7/1973 | Gross | 206/527 |
| 4,415,100 | 11/1983 | Hutchinson | 222/108 |
| 4,892,194 | 1/1990 | Garcia | 206/461 |
| 5,549,388 | 8/1996 | Wilkes | 383/84 |

FOREIGN PATENT DOCUMENTS 689964  7/1964  Canada .................. 206/813

*Primary Examiner*—Paul T. Sewell
*Assistant Examiner*—Luan K. Bui

[57] ABSTRACT

A debris catching pouch for attaching to a generally vertical surface of a structure to catch debris falling from a drill drilling a hole in the surface of the structure. The pouch includes a back panel and a front panel coupled to the front surface of the back panel to define a pocket for catching debris between the back panel and the front panel. The back surface of the back panel has an adhesive provided thereon for adhesive attachment of the back surface of the back panel to the surface of a structure.

2 Claims, 3 Drawing Sheets

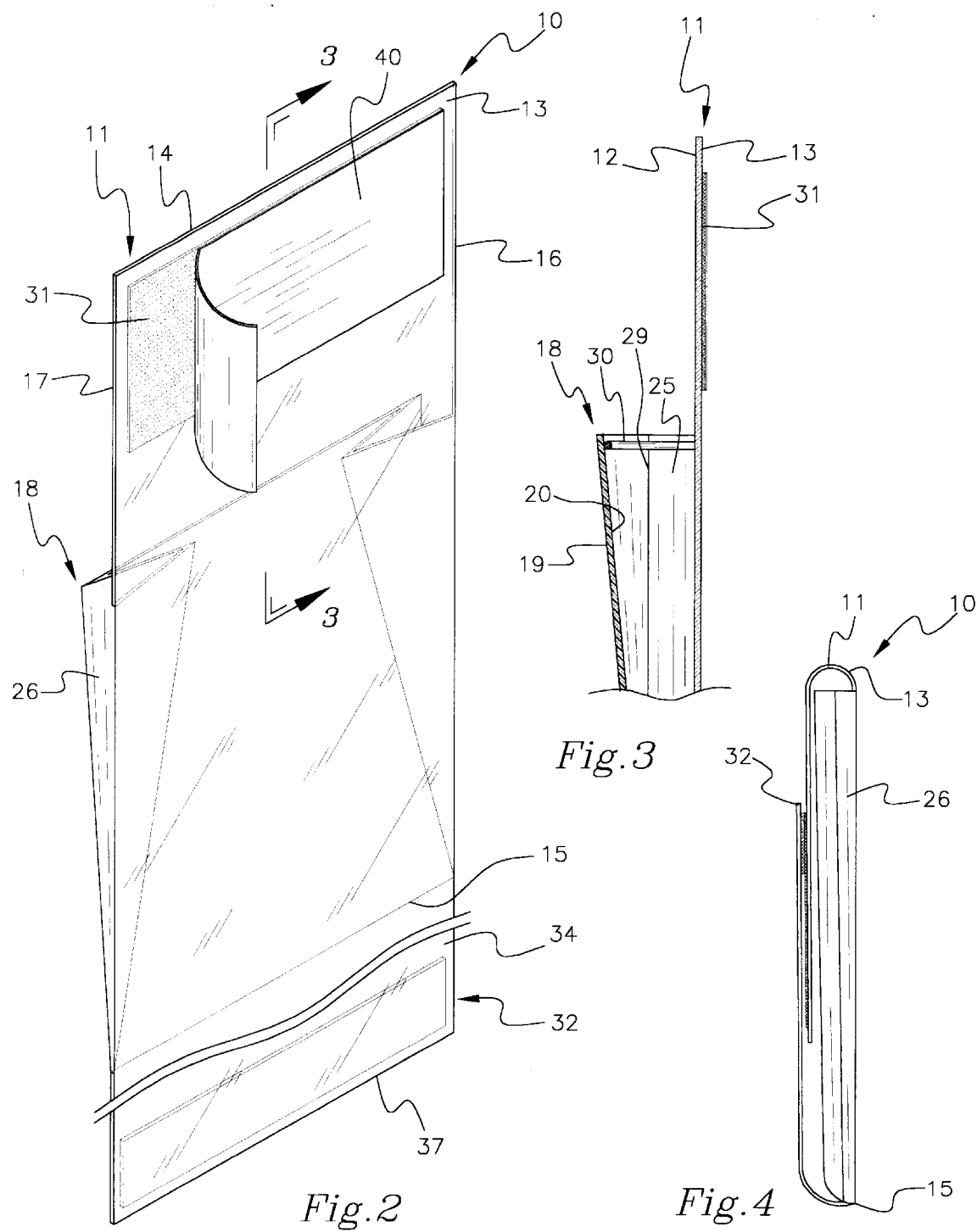

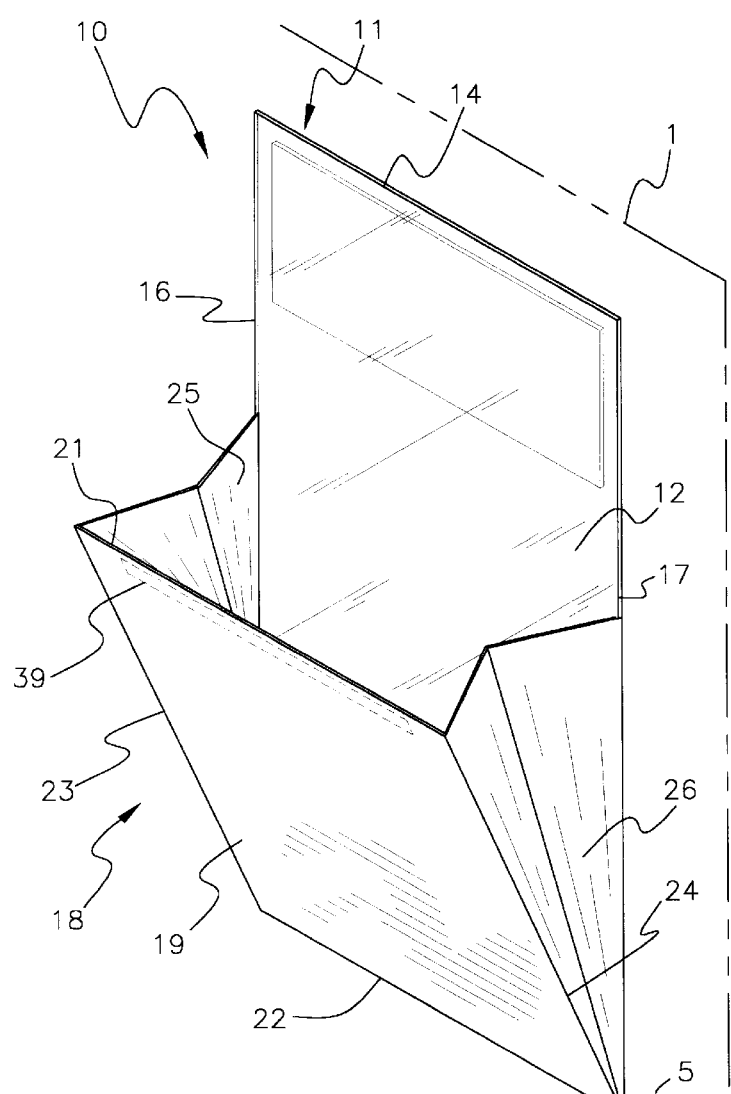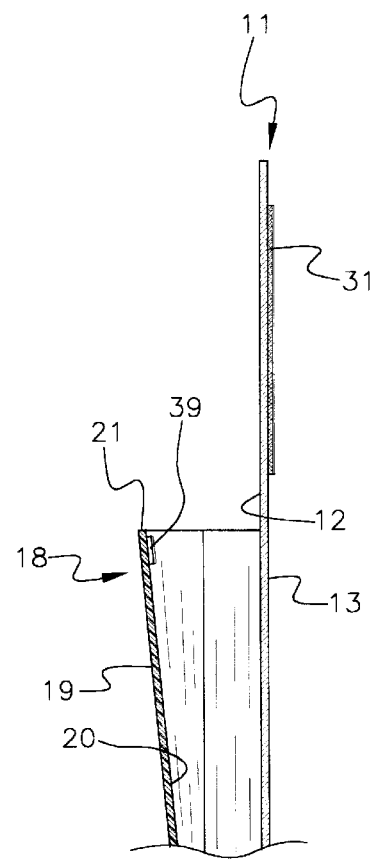

DEBRIS CATCHING POUCH

BACKGROUND OF THE INVENTION

1. Field of the Invention

The present invention relates to drilling accessories for catching and collecting debris and more particularly pertains to a new debris catching pouch for attaching to a generally vertical surface of a structure to catch debris falling from a drill drilling a hole in the surface of the structure.

2. Description of the Prior Art

The use of drilling accessories for catching and collecting debris is known in the prior art. More specifically, drilling accessories for catching and collecting debris heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,251,171; U.S. Pat. No. 3,936,213; U.S. Pat. No. 3,747,776; U.S. Pat. No. 5,484,635; U.S. Pat. No. 4,415,100; and U.S. Pat. No. Des. 311,028.

While these devices fulfill their respective, particular objectives and requirements, the aforementioned patents do not disclose a new debris catching pouch. The inventive device includes a back panel and a front panel coupled to the front surface of the back panel to define a pocket for catching debris between the back panel and the front panel. The back surface of the back panel has an adhesive provided thereon for adhesive attachment of the back surface of the back panel to the surface of a structure.

In these respects, the debris catching pouch according to the present invention substantially departs from the conventional concepts and designs of the prior art, and in so doing provides an apparatus primarily developed for the purpose of attaching to a generally vertical surface of a structure to catch debris falling from a drill drilling a hole in the surface of the structure.

SUMMARY OF THE INVENTION

In view of the foregoing disadvantages inherent in the known types of drilling accessories for catching and collecting debris now present in the prior art, the present invention provides a new debris catching pouch construction wherein the same can be utilized for attaching to a generally vertical surface of a structure to catch debris falling from a drill drilling a hole in the surface of the structure.

The general purpose of the present invention, which will be described subsequently in greater detail, is to provide a new debris catching pouch apparatus and method which has many of the advantages of the drilling accessories for catching and collecting debris mentioned heretofore and many novel features that result in a new debris catching pouch which is not anticipated, rendered obvious, suggested, or even implied by any of the prior art drilling accessories for catching and collecting debris, either alone or in any combination thereof.

To attain this, the present invention generally comprises a back panel and a front panel coupled to the front surface of the back panel to define a pocket for catching debris between the back panel and the front panel. The back surface of the back panel has an adhesive provided thereon for adhesive attachment of the back surface of the back panel to the surface of a structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new debris catching pouch apparatus and method which has many of the advantages of the drilling accessories for catching and collecting debris mentioned heretofore and many novel features that result in a new debris catching pouch which is not anticipated, rendered obvious, suggested, or even implied by any of the prior art drilling accessories for catching and collecting debris, either alone or in any combination thereof.

It is another object of the present invention to provide a new debris catching pouch which may be easily and efficiently manufactured and marketed.

It is a further object of the present invention to provide a new debris catching pouch which is of a durable and reliable construction.

An even further object of the present invention is to provide a new debris catching pouch which is susceptible of a low cost of manufacture with regard to both materials and labor, and which accordingly is then susceptible of low prices of sale to the consuming public, thereby making such debris catching pouch economically available to the buying public.

Still yet another object of the present invention is to provide a new debris catching pouch which provides in the apparatuses and methods of the prior art some of the advantages thereof, while simultaneously overcoming some of the disadvantages normally associated therewith.

Still another object of the present invention is to provide a new debris catching pouch for attaching to a generally vertical surface of a structure to catch debris falling from a drill drilling a hole in the surface of the structure.

Yet another object of the present invention is to provide a new debris catching pouch which includes a back panel and a front panel coupled to the front surface of the back panel to define a pocket for catching debris between the back panel and the front panel. The back surface of the back panel has an adhesive provided thereon for adhesive attachment of the back surface of the back panel to the surface of a structure.

Still yet another object of the present invention is to provide a new debris catching pouch that also protects the surface of the structure being drill into from additional damage and soiling from debris and dust from the drilling of the hole.

Even still another object of the present invention is to provide a new debris catching pouch that is easy to dispose of when filled with debris.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic back perspective view of the lower flap embodiment of the present invention.

FIG. 3 is a schematic cross sectional view of the lower flap embodiment of the present invention with a support frame in the pocket taken from line 3—3 of FIG. 2.

FIG. 4 is a schematic side view of the lower flap embodiment of the present invention with the top portion of the back panel and the lower flap folded over the pocket to close the pocket.

FIG. 5 is a schematic front perspective view of the present invention.

FIG. 6 is a schematic cross sectional view of the present invention illustrated in FIG. 5.

DESCRIPTION OF THE PREFERRED EMBODIMENT

Figure 1:
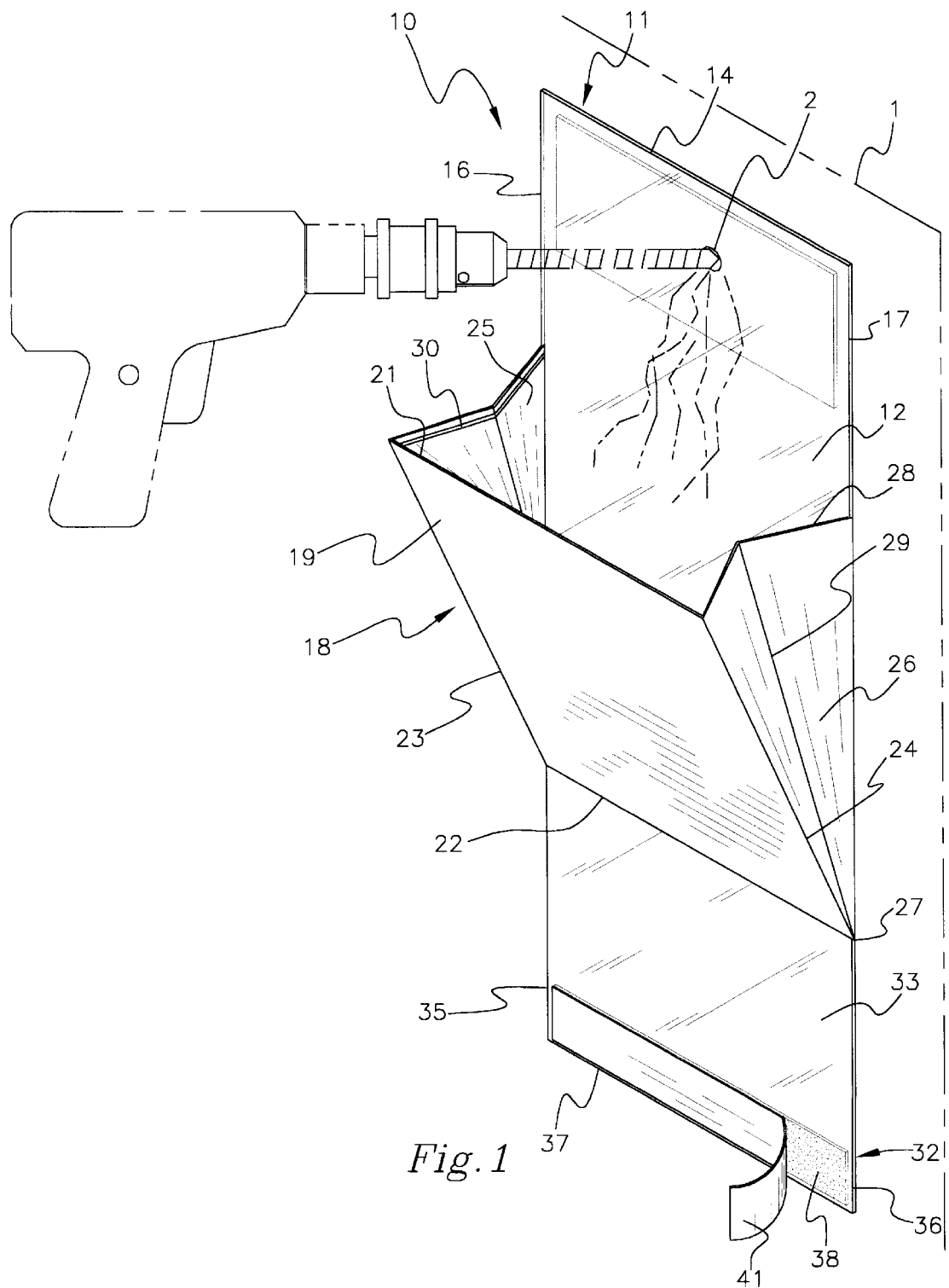
FIG. 1 is a schematic perspective view of a lower flap embodiment of a new debris catching pouch in use according to the present invention.

With reference now to the drawings, and in particular to FIGS. 1 through 6 thereof, a new debris catching pouch embodying the principles and concepts of the present invention and generally designated by the reference numeral 10 will be described.

As best illustrated in FIGS. 1 through 6, the debris catching pouch 10 generally comprises a back panel 11 and a front panel 18 coupled to the front surface 12 of the back panel 11 to define a pocket for catching debris between the back panel 11 and the front panel 18. The back surface 13 of the back panel 11 has an adhesive 31 provided thereon for adhesive attachment of the back surface 13 of the back panel 11 to the surface of a structure 1.

As illustrated in FIG. 1, in use, the pouch 10 is designed for attaching to a surface of a structure 1 for collecting debris from the drilling of a hole 2 into the surface of the structure.

Specifically, the back panel 11 is generally rectangular and has front and back surfaces 12,13, and an outer perimeter comprising generally straight top and bottom end edges 14,15 and a pair of generally straight side edges 16,17 extending between the end edges 14,15 of the back panel. The length of the back panel 11 is defined between the top and bottom end edges 14,15 of the back panel 11 while the width back panel 11 is defined between the side edges 16,17 of the back panel 11. The front panel 18 is generally rectangular and has front and back surfaces 19,20, and an outer perimeter comprising generally straight top and bottom end edges 21,22 and a pair of generally straight side edges 23,24 extending between the end edges 21,22 of the front panel 18. The length of the front panel 18 is defined between the top and bottom end edges 21,22 of the front panel 18 and the width of the front panel 18 is defined between the side edges 25,26 of the front panel 18. The length of the back panel 11 is greater than the length of the front panel 18.

The back surface 20 of the front panel 18 faces the front surface 12 of the back panel 11 so that the back surface 20 of the front panel 18 and the front surface 12 of the back panel 11 define a pocket for collecting debris and dust therein from a hole 2 drilled through the back panel 11 into the surface of the structure 1. The bottom end edge 22, and the side edges 25,26 of the front panel 18 are coupled to the back panel 11 such that the top end edge 21 of the front panel 18 is positioned between the top and bottom end edges of the back panel 11. In one preferred basic embodiment, the bottom end edge 22 of the front panel 18 is coupled to the bottom end edge 15 of the back panel 11, one of the side edges 25 of the front panel 18 is coupled to one of the side edges 16 of the back panel 11, and another of the side edges 26 of the front panel 18 is coupled to another of the side edges 17 of the back panel 11. In this embodiment, it is preferred that the width of the front panel 18 is greater than the width of the back panel 11 such that the front panel 18 puckers outward towards the top end edge 21 of the front panel 18 to help keep the back surface 20 of the front panel 18 spaced apart from the front surface 12 of the back panel 11. This keeps the pocket formed between open to collect debris.

In another preferred embodiment, each side edge 23,24 of the front panel 18 is coupled to their associated side edge 16,17 of the back panel 11 by an associated side panel 25,26 to help keep the back surface 20 of the front panel 18 spaced apart from the front surface 12 of the back panel 11 so that the pocket formed between then is kept open to collect debris. Specifically, one of the side panels 25 couples the one side edge 23 of the front panel 18 to the one side edge 16 of the back panel 11 while the other side panel 26 couples the other side edge 24 of the front panel 18 to the other side edge 17 of the back panel 11. Each of the side panels 25,26 is generally triangular and has a lower vertex 27 and an generally straight upper edge 28. The lower vertices 27 of the side panels 25,26 are located adjacent the bottom end edge 22 of the front panel 18 and the upper edges 28 of the side panels 25,26 are located adjacent the top end edge 21 of the front panel 18. Each side panel has an elongate fold 29 extending from the lower vertex 27 to the upper edge 28 of the side panel. The fold 29 is preferably extended generally perpendicular to the upper edge 28 of the side panel. In use, the fold 29 is designed for easy collapsing of the pocket when not in use so that the pouch is generally flat when not in use.

Optionally, a generally rectangular U-shaped elongate support frame 30 may be provided in the pocket. The support frame 30 extended adjacent the upper edges 28 of the side panels 25,26 and the top end edge 21 of the front panel 18 against the back surface 20 of the front panel 18. The support frame 30 is designed for helping keeping the top end edge 21 of the front panel 18 spaced apart from the front surface 12 of the back panel 11 to help keep the pocket open for collecting debris.

The back surface 13 of the back panel 11 has an adhesive 31 provided thereon for adhesive attachment of the back surface 13 of the back panel 11 to the surface of a structure to be drilled into. Preferably, the adhesive 31 of the back surface 13 of the back panel 11 is provided in a generally rectangular region located adjacent the top end edge 14 of the back panel 11. Ideally, a generally rectangular removable protective cover sheet 40 covers the adhesive 31 of the back surface 13 of the back panel 11 to prevent adhesion of the adhesive until the protective cover is peeled from the adhesive by the user to mount the pouch to the surface of a structure. Preferably, the adhesive used on the back panel 11 is strong enough to stick and hold the pouch to the surface of a structure but not so strong that it pulls off paint and wallpaper on the surface of the structure when the pouch is removed.

In another optional preferred embodiment, the back surface 20 of the front panel 18 may an adhesive 39 provided thereon in a generally rectangular region extending between the side edges 25,26 of the front panel 18 adjacent the top end edge 21 of the front panel 18. The adhesive 39 of the front panel 18 is designed for adhesive attachment to the front surface 12 of the back panel 11 to close the pocket when the pocket is filled with debris to prevent debris from spilling out of the pocket. Optionally, this adhesive 39 may be provided on a corresponding location on the front surface 12 of the back panel 11 or, as another option, a flap may be attached to the top end edge 21 of the front panel 18 with the adhesive 39 provided thereon. Ideally, a generally rectangular removable protective cover sheet covers the adhesive of the front panel 18 to prevent adhesion of the adhesive until this other protective cover is peeled from the adhesive by the user.

In another preferred embodiment of the pouch, a flexible generally rectangular lower flap 32 is integrally coupled to the bottom end edge 15 of the back panel 11. The lower flap 32 has generally flat front and back surfaces 33,34, a pair of side edges 35,36, and a lower end edge 37. The lower flap 32 is generally coplanar with the back panel 11 and the side edges 35,36 of the lower flap 32 are generally collinear with their associated side edge of the back panel 11. In use as illustrated in FIG. 4, a top portion of the back panel 11 located between the top end edge 14 of the back panel 11 and the top end edge 21 of the front panel 18 is foldable over the front panel 18 to cover the pocket. The lower flap 32 is foldable over the front panel 18 and the top portion of back panel 11. The lower flap 32 is attachable to the top portion of the back flap to help keep the pocket covered by the top portion of the back panel 11. Preferably, the front surface 33 of the lower flap 32 has an adhesive 38 provided thereon in a generally rectangular region extending between the side edges 35,36 of the lower flap 32 adjacent the lower end edge of the lower flap 37 32. The adhesive 38 of the lower flap 32 is designed for adhesive attachment to the top portion of the back panel 11 when the top portion of the back panel 11 is folded over the front panel 18. Ideally, another generally rectangular removable protective cover sheet 41 covers the adhesive of the lower flap 32 to prevent adhesion of the adhesive until this other protective cover is peeled from the adhesive by the user.

Ideally, the pouch is sufficiently sized to permit the drilling of a hole through it and the structure behind it without debris and dust is spewed on to the uncovered surrounding surface of the structure. Preferably, the width of the back panel 11 is greater than about 1 inches and the length of the back panel 11 is greater than about 2 inches. Ideally, the width of the back panel 11 is between about 2 inches and 3 inches and the length of the back panel 11 is between about 3 inches and about 5 inches.

The panels of the pouch should preferably comprise a flexible material such as a plastic, such as polyethylene. Ideally, the flexible material is also transparent so that marks on the surface of the structure indicating the location of the hole to be drilled may be easily seen by the user. The flexible material of the back panel 11 should also preferably be sufficiently thick to not impede the passage of a drill through it but strong enough to hold the pouch to the surface of the structure and not tear when the pouch is removed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pouch for attaching to a surface of a structure for collecting debris from the drilling of a hole into the surface of the structure, said pouch comprising:

a back panel being generally rectangular and having front and back surfaces, an outer perimeter comprising generally straight top and bottom end edges and a pair of generally straight side edges extending between said end edges of said back panel;

said back panel having a length defined between said top and bottom end edges of said back panel, said back panel having a width defined between said side edges of said back panel;

a front panel being generally rectangular and having front and back surfaces, an outer perimeter comprising generally straight top and bottom end edges and a pair of generally straight side edges extending between said end edges of said front panel;

said front panel having a length defined between said top and bottom end edges of said front panel, said front panel having a width defined between said side edges of said front panel;

said length of said back panel being greater than said length of said front panel;

said back surface of said front panel facing said front surface of said back panel, said back surface of said front panel and said front surface of said back panel defining a pocket for collecting debris and dust therein from a hole drilled through the back panel into the surface of the structure;

said bottom end edge and said side edges of said front panel coupled to said back panel such that said top end edge of said front panel is positioned between said top and bottom edges of said back panel;

said bottom end edge of said front panel being coupled to said bottom end edge of said back panel, one of said side edges of said front panel being coupled to one of said side edges of said back panel, another of said side edges of said front panel being coupled to another of said side edges of said back panel;

said width of said front panel being greater than said width of said back panel such that the front panel extends outward and said top end edge of said front panel is spaced apart from said front surface of said back panel so that said pocket is formed therebetween;

a pair of side panels, one of said side panels coupling said one side edge of said front panel to said one side edge of said back panel, another of said side panels coupling said other side edge of said front panel to said other side edge of said back panel;

each of said side panels being generally triangular and having a lower vertex and a generally straight upper edge, said lower vertices of said side panels being located adjacent said bottom end edge of said front panel, upper edges of said side panels being located adjacent said top end edge of said front panel;

each side panel having an elongate fold extending from said lower vertex to said upper edge of said side panel, said fold being extended generally perpendicular to said upper edge of said side panel;

said back surface of said back panel has an adhesive provided thereon for adhesive attachment of said back surface of said back panel to the surface of a structure to be drilled;

said adhesive of said back surface of said back panel being provided in a generally rectangular region located adjacent said top end edge of said back panel;

wherein a generally rectangular removable protective cover sheet covers said adhesive of said back surface of said back panel to prevent adhesion of said adhesive;

a flexible generally rectangular lower flap being integrally coupled to said bottom end edge of said back panel, said lower flap having generally flat front and back surfaces, a pair of side edges, and a lower end edge, said lower flap being generally coplanar with said back panel and said side edges of said lower flap each being collinear with one of said side edges of said back panel;

a top portion of said back panel located between said top end edge of said back panel and said top end edge of said front panel adapted for being folded over said front panel to cover said pocket, said lower flap adapted for being folded over said front panel and said top portion of back panel, said lower flap being attachable to said top portion of said back flap to help keep said pocket covered by said top portion of said back panel; and said front surface of said lower flap having an adhesive provided thereon in a generally rectangular region extending between said side edges of said lower flap adjacent said lower end edge of said lower flap, said adhesive of said lower flap being for adhesive attachment to said top portion of said back panel when said top portion of said back panel is folded over said front panel;

wherein another generally rectangular removable protective cover sheet covers said adhesive of said lower flap to prevent adhesion of the adhesive;

said back surface of said front panel having an adhesive provided thereon in a generally rectangular region extending substantially an entire length between said side edges of said front panel adjacent said top end edge of said front panel, said adhesive of said front panel being for adhesive attachment to said front surface of said back panel to close said pocket when said pocket is filled with debris to prevent debris from spilling out of said pocket;

wherein a generally rectangular removable protective cover sheet covers said adhesive of said front panel to prevent adhesion;

said pouch being sufficiently sized to permit the drilling of a hole therethrough and the structure therebehind without debris and dust being spewed on to an uncovered surrounding surface of the structure;

wherein said width of said back panel is between about 2 inches and 3 inches and 3 inches, wherein said length of said back panel is between about and about 5 inches;

said panels of said pouch comprising a flexible plastic material, wherein said flexible plastic material is transparent so that marks on the surface of the structure indicating a location of the hole to be drilled may be easily seen by the user.

2. A pouch as set forth in claim 1 wherein a generally rectangular U-shaped elongate support frame is provided in said pocket, said support frame extended adjacent said upper edges of said side panels and said top end edge of said front panel against said back surface of said front panel, said support frame being for maintaining said top end edge of said front panel spaced apart from said front surface of said back panel to maintain said pocket open for collecting debris.

* * * * *